(12) United States Patent
Takagi

(10) Patent No.: US 10,371,883 B2
(45) Date of Patent: Aug. 6, 2019

(54) DISPLAY DEVICE

(71) Applicant: OMRON Corporation, Kyoto-shi, Kyoto (JP)

(72) Inventor: Yoshihiko Takagi, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 11 days.

(21) Appl. No.: 15/866,639

(22) Filed: Jan. 10, 2018

(65) Prior Publication Data

US 2018/0267230 A1 Sep. 20, 2018

(30) Foreign Application Priority Data

Mar. 14, 2017 (JP) ................. 2017-048874

(51) Int. Cl.
| | |
|---|---|
| *G02B 6/00* | (2006.01) |
| *F21V 8/00* | (2006.01) |
| *G02F 1/00* | (2006.01) |
| *G02F 1/01* | (2006.01) |

(52) U.S. Cl.
CPC ......... *G02B 6/0068* (2013.01); *G02B 6/0076* (2013.01); *G02F 1/0063* (2013.01); *G02F 1/0105* (2013.01)

(58) Field of Classification Search
CPC .................................................. G02B 6/0076
USPC ....................................................... 362/613
See application file for complete search history.

(56) References Cited

U.S. PATENT DOCUMENTS

| | | | | |
|---|---|---|---|---|
| 5,124,890 A | * | 6/1992 | Choi ................... | G02B 6/0026 362/23.01 |
| 6,308,444 B1 | * | 10/2001 | Ki .......................... | G09F 13/18 362/293 |
| 7,024,809 B1 | * | 4/2006 | Poma .................... | G02B 6/006 264/400 |
| 2001/0038532 A1 | * | 11/2001 | Harbers ............... | G02B 6/0036 362/616 |
| 2004/0114344 A1 | * | 6/2004 | Burtsev ................ | G02B 6/0001 362/604 |
| 2006/0164862 A1 | * | 7/2006 | Chien .................. | G02B 6/0038 362/619 |
| 2010/0118403 A1 | * | 5/2010 | Laitinen ................ | G02B 6/006 359/567 |
| 2016/0365038 A1 | * | 12/2016 | Min ...................... | G09G 3/2092 |
| 2017/0168452 A1 | * | 6/2017 | Matsuo .................. | G02B 6/005 |

FOREIGN PATENT DOCUMENTS

JP        H11-85075 A        3/1999

* cited by examiner

*Primary Examiner* — Christopher M Raabe
(74) *Attorney, Agent, or Firm* — Metrolexis Law Group, PLLC

(57) ABSTRACT

A display device includes a plurality of transparent display units, each unit configured to include a light emitting surface; the display units arranged spaced apart by a predetermined distance in a direction perpendicular to the light emitting surfaces such that the light emitting surfaces are parallel to each other; and each light emitting surface outputs a monochromatic grayscale image of a mutually different color.

20 Claims, 8 Drawing Sheets

DISPLAY DEVICE

CROSS REFERENCE TO RELATED APPLICATIONS

This application claims priority from prior Japanese Patent Application No. 2017-048874 filed with the Japan Patent Office on Mar. 14, 2017, the entire contents of which are incorporated herein by reference.

FIELD

The disclosure relates to a display device. The disclosure relates in particular to a richly expressive display device with clear changes in color tone.

BACKGROUND

Display devices may present information as an image. Existing display techniques have been devised so that such devices may provide a user with a variety of information. For instance, Japanese Patent Publication No. H11-85075 (published 30 Mar. 1999) discloses a display device 1 that varies the light intensity for a plurality of light sources to optically change the display and thus to provide rich transitions.

However, the above described existing technology combines projections of red, green, and blue lights, and then radiates this light projection onto the front surface of a transparent part via the light guide plate in the transparent part. The light radiated onto the front surface of the transparent part is therefore substantially uniform. Accordingly, the existing technology really only provides a monochromatic display, and thus provides poor visual expressiveness.

One or more embodiments are for addressing the aforementioned problem, and provide a richly expressive display device with clear changes in color tone.

SUMMARY

To address the foregoing a display device according to one or more embodiments includes a plurality of transparent display units, each unit configured to include a light emitting surface; the display units arranged spaced apart by a predetermined distance in a direction perpendicular to the light emitting surfaces such that the light emitting surfaces are parallel to each other; and each light emitting surface outputs a monochromatic grayscale image of a mutually different color.

The above configuration makes it possible to see a combined image wherein the monochromatic grayscale images are superposed with each monochromatic grayscale image made up of a mutually different color and output from the light emitting surfaces of the display units that are arranged spaced apart. Given that the display surfaces are arranged spaced apart, the manner in which monochromatic grayscale images are superposed changes in accordance with the location of the user's viewpoint. Hereby a display device may be provided, where the light emitting surface therein outputs a richly expressive image with characteristic display effects that are different from providing a stereoscopic image.

The display device according to one or more embodiments is configured to include three display units where the monochromatic grayscale images output by the light emitting surfaces of the display units are red, green, and blue grayscale images respectively.

In the aforementioned configuration each of the light emitting surfaces of the three display units may output monochromatic grayscale images from red light, green light, and blue light. Hereby is provided a display device that exhibits superior effects such as outputting an image on the basis of the primary colors with clear changes in color tone.

In the display device according to one or more embodiments a combined image is a combination of said monochromatic grayscale images, and the tones of red, green, and blue are set to the maximum value in at least a portion of said combined image such that said portion appears as white light when viewed from the front.

The aforementioned configuration allows for at least a portion of the combined image to show a bright white visual when the combined image is viewed from the front. Accordingly, this allows for a bright full color visual that includes white.

The display device according to one or more embodiments may be configured such that the monochromatic grayscale images of mutually different colors output from each of the light emitting surfaces may have a substantially identical design.

This configuration shows the user a full-color image by way of each of the colors being appropriately combined when the user views the image from the front.

The display device according to one or more embodiments may be configured such that the display units are light guide plates that direct light entering therein and cause a portion of the light to exit from the light emitting surface; and the light guide plates include a specific emission pattern.

The aforementioned configuration causes the monochromatic grayscale image to be output from the light emitting surface in accordance with the specific emission pattern in the light guide plate. Hereby, combining the emission patterns of the plurality of light guide plates thereby exhibits superior effects such as providing a richly expressive display device with clear changes in color tone.

The display device according to one or more embodiments may be configured to include three of said light guide plates (10, 20, 30); and a plurality of light sources; each light source is optically coupled to a single light guide plate; the light sources are disposed at the end surfaces of the light guide plates; and the light sources each emit red, green, and blue light to the corresponding light guide plate.

The aforementioned configuration allows the light guide plates to output a grayscale image according to the monochromatic light emitted by the light source from the light emitting surface. Hereby, the combination of monochromatic light is established in accordance with the light source.

In another configuration of the display device the emission patterns have a length parallel to the light emitting surface, and a width that is perpendicular to said length; and the light guide plates manifest the tone in the grayscale image in accordance with the length of the emission patterns.

The aforementioned configuration allows the light emitting surface of the light guide plates to output a monochromatic grayscale image with a tone manifested in accordance with the width of the emission patterns. For instance, the length of the emission patterns may be mutually different between light guide plates so that the light guide plates output monochromatic grayscale images of different tones.

In another configuration of the display device the emission patterns have a length parallel to the light emitting surface, and a width that is perpendicular to said length; and the light guide plates manifest the tone in the grayscale image in accordance with the length of the emission patterns.

The aforementioned configuration allows the light emitting surface of the light guide plates to output a monochromatic grayscale image with a tone manifested in accordance with the length of the emission patterns. For instance, the length of the emission patterns may be mutually different between light guide plates so that the light guide plates output monochromatic grayscale images of different tones.

The display device according to one or more embodiments may be configured such that the light guide plates manifest the tone in the grayscale image in accordance with the density of the emission patterns.

The aforementioned configuration allows the light emitting surface of the light guide plates to output a monochromatic grayscale image with a tone manifested in accordance with the density of the emission patterns. For instance, the density of the emission patterns may be mutually different between light guide plates so that the light guide plates output monochromatic grayscale images of different tones.

The display device according to one or more embodiments may be configured such that the predetermined distance is no greater than 15 mm.

The aforementioned configuration achieves the following display effects. That is, a display effect where the grayscale images from the light guide plates to appear superposed when the user's eyes are within a predetermined range for sizes typically used in design, for instance when designing a game machine; at the same time the aforementioned configuration allows the grayscale images from the light guide plates to appear shifted from each other when the user's eyes are not in the predetermined range.

The display device according to one or more embodiments may be configured such that the distance between the centers of the display units in the thickness direction thereof is no less than double the thickness of the display units.

The display device according to one or more embodiments may be configured such that the distance between the centers of the display units in the thickness direction thereof is no less than quadruple the thickness of the display units.

A game machine according to one or more embodiments is provided with a display device configured according to any of one or more embodiments, with the game machine configured so that visuals are presented on the display device in accordance with the progress of play.

The aforementioned configuration provides the same effects as the display device of one or more embodiments.

EFFECTS

One or more embodiments are for addressing the aforementioned problem, and provide a richly expressive display device with clear changes in color tone.

BRIEF DESCRIPTION OF THE DRAWINGS

FIG. 3A is a schematic view illustrating when the display surface of the display device is viewed from the front; and FIG. 3B is a schematic view illustrating when the display surface of the display device is viewed diagonally;

FIG. 5A is a schematic view illustrating the differences in visual angle with the ends of the light guide plates when a user faces the center of the display surface; and FIG. 5B is a schematic view illustrating the differences in visual angle with the ends of the light guide plates when a user faces one end of the display surface and views the other end of the display surface.

DETAILED DESCRIPTION

First Embodiment

One or more embodiments are described below in detail with reference to FIG. 1 to FIG. 6.

Display Device Configuration

Figure 1:
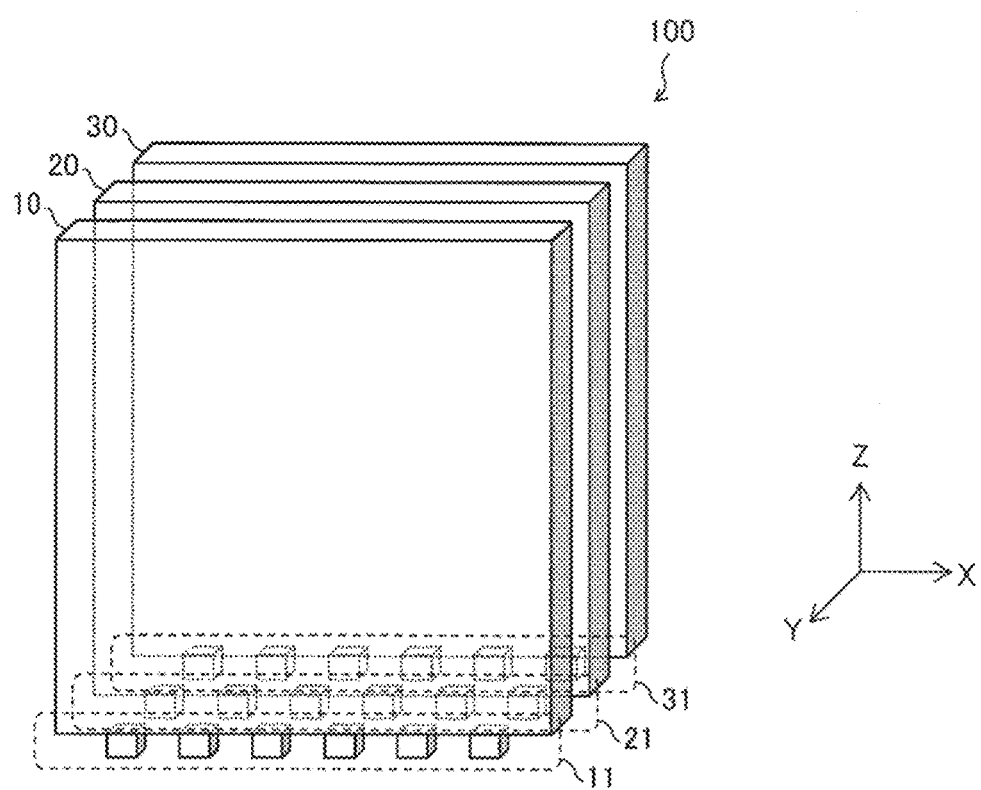
FIG. 1 is a schematic view illustrating a display device according to a first embodiment.

The principle configuration of a display device 100 according to one or more embodiments is described with reference to FIG. 1. FIG. 1 is a schematic view of the display device 100 according to an embodiment.

The display device 100 is provided with a first light guide plate 10, a second light guide plate 20, and a third light guide plate 30; the first light guide plate 10, second light guide plate 20, and third light guide plate 30 are optically connected to a first light source 11, a second light source 21, and a third light source 31, respectively.

Each light emitting surface of a plurality of transparent display units in the display device 100 outputs a monochromatic grayscale image of a mutually different color. The display device 100 outputs the image on the basis of commands from a controller (not shown). The display units in the display device 100 are arranged with the light emitting surfaces therefor parallel to each other with spaces therebetween. That is, viewing the light emitting surface of the light guide plate from the front, the user is able to perceive a combined image wherein the monochromatic grayscale images output from the light emitting surfaces of the light guide plates are superposed. Note that a monochromatic grayscale image may be identical images, or may be separate images that are mutually different.

More specifically, the display device 100 according to one or more embodiments is equipped with a first light guide plate 10, a second light guide plate 20, and a third light guide plate 30 serving as transparent display units; each light guide plate outputs a monochromatic grayscale image of a mutually different color. In the example illustrated, when a user views the XZ plane of the display device 100 from the front in the Y direction, the user perceives a combined image; this combined image is where each of the images output from the first light guide plate 10, the second light guide plate 20, and the third light guide plate 30 are superposed.

Note that in the following description, when a user views the XZ plane of display device 100 from the front in the Y direction, the light emitting surface of the first light guide plate 10 facing said user is called the display surface of the display device 100. Additionally, while in the example 3 light guide plates serve as the trends the plurality of transparent display units in the display device 100, any plurality of light templates may be used. For instance, two or four light guide plates may be used.

The first light guide plate 10, the second light guide plate 20, and the third light guide plate 30 direct light entering therein, and allow a portion of the light to exit from the light emitting surface. As illustrated, the first light guide plate 10, the second light guide plate 20, and the third light guide plate 30 are rectangular solids of identical size and are completely overlapped in the y-axis direction The light emitting surfaces thereof are arranged parallel to the X in the drawing to the plane. The first and second light guide plates 10, 20 and the second and third light guide plates 20, 30, and the respective light emitting surfaces are arranged side by side. In other words, the three light guide plates are arranged spaced at predetermined distances along a direction perpendicular to each of the light emitting surfaces thereof (i.e., the Y axis direction). The predetermined distance at which the light guide plates are arranged is described later.

Given that each of the light guide plates are a transparent display unit, for example the monochromatic grayscale image output from the light emitting surface of the third light guide plate 30 passes through the second light guide plate 20 and the first light guide plate 10 and is output toward the front in the Y direction. Accordingly, a user perceives the plurality of monochromatic grayscale images output from the light emitting surfaces of light guide plates as a combined image where the images are superimposed.

Figure 2:
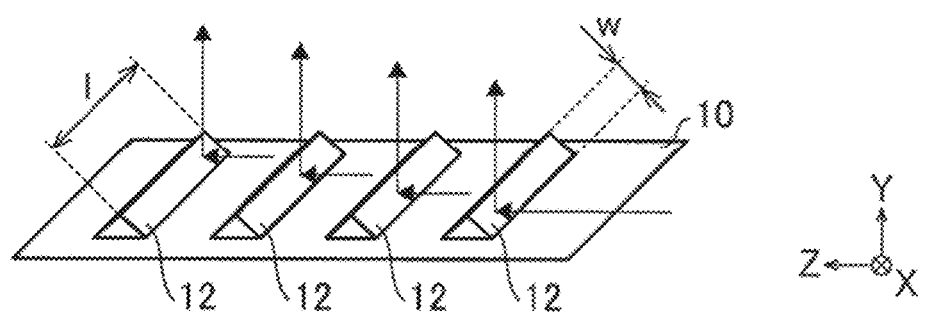
FIG. 2 is a schematic view illustrating an example of an emission pattern from a display unit in a display device according to a first embodiment.

Each of the light guide plates possesses a specific emission pattern and causes light to exit from the light emitting surface in accordance with the aforementioned emission pattern. FIG. 2 depicts one example of an emission pattern in a light guide plate. FIG. 2 is a schematic view depicting an example of emission patterns from the first light guide plate 10 in the display device 100 according to one or more embodiments.

As illustrated, the first light guide plate 10 is provided with a plurality of emission patterns 12. An emission pattern 12 changes the direction of light incident thereon and causes light to exit from the light emitting surface; in other words the emission pattern 12 is an area that functions as a light emitting unit. An emission pattern 12 may be a prism. For instance, as depicted in the example the emission pattern 12 causes light incident thereon from the negative z-axis direction to exit toward the front direction. The grayscale image presented by the entire first light guide plate 10 which is made up of a plurality of emission patterns 12 is manifested by changing at least one of the width w, length 1, and density of the emission pattern 12 in accordance with the location at which the emission pattern 12 is arranged. Here, the length 1 of the emission pattern 12 is the length thereof in the direction parallel to the light emitting surface, and the width w is the width in the direction perpendicular to the length. That is, an emission pattern 12 has a length 1 parallel to the light emitting surface, and a width w that is perpendicular to said length. The first light guide plate 10 manifests the tone of the grayscale image in accordance with the width of the emission patterns. Note that while FIG. 2 is used for the description of the first light guide plate 10, the second light guide plate 20 and the third light guide plate 30 may be considered the same.

In the example illustrated in FIG. 2, light incident on an emission pattern 12 is reflected thereby and exits from the light emitting surface; however, the configuration is not limited thereto. For instance, light incident on an emission pattern 12 may pass through or be refracted by the emission pattern to exit from the light emitting surface.

The first light source 11, the second light source 21, and the third light source 31 are optically coupled to the first light guide plate 10, the second light guide plate 20, and the third light guide plate 30 respectively. In the example illustrated, the first light source 11, the second light source 21, and the third light source 31 are connected to the lower part of the first light guide plate 10, the second light guide plate 20, and third light guide plate 30 respectively (where forward in the Z axis direction is toward the top). However, the light sources are not limited to being connected at this position. The three light sources also output light to the corresponding light guide plate on the basis of commands from a controller (not shown).

In this embodiment the first light source 11, the second light source 21, and the third light source 31 each output light of a different color to the first light guide plate 10, the second light guide plate 20, and third light guide plate 30 respectively At this point the users sees an image made up of light from the second light source 21, and the image made up of light from the third light source 31 superposed on the monochromatic grayscale image made up of light output from the first light source 11, and perceives the same as an image output with natural color tones. The first light source 11, the second light source 21, and the third light source 31 may each output light of any color combination. For instance, each of the first light source 11, the second light source 21, and the third light source 31 may be configured to each output the three primary colors of light, i.e., red, green, and blue. Here, a combined image superposing monochromatic grayscale images of each red, green, and blue light may be recognized as a full color image with clear changes in the color tone. If configured to have two or four light guide plates instead of three, the display device may be configured with monochromatic light sources that output two or four colors.

Images that Appear Different Depending on the Viewing Position

Figure 3A:
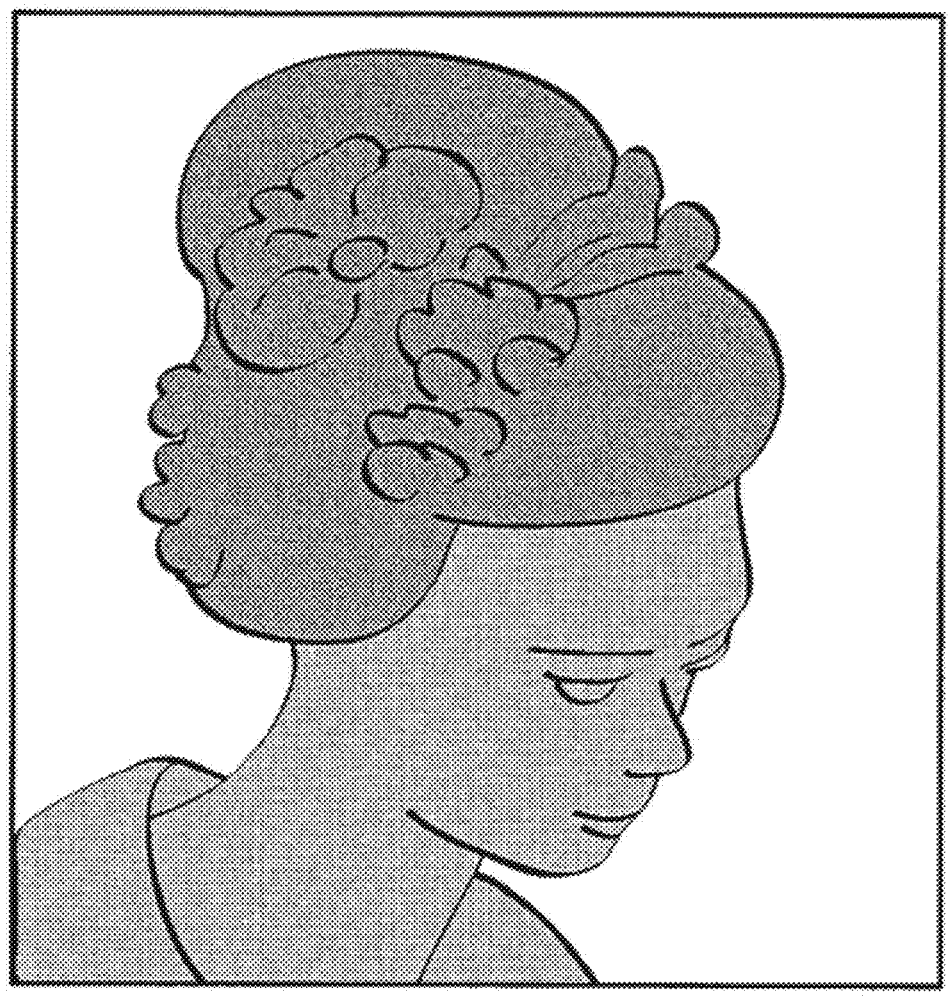
FIGS. 3A and 3B are diagrams illustrating examples of images output by a display device according to a first embodiment.
Figure 3B:

The difference in how an image is seen based on the location of the user's viewing position relative to the light emitting surface in the display device 100 is described using FIG. 3. FIGS. 3A and 3B are examples of images output by a display device according to one or more embodiments; FIG. 3A is a schematic view illustrating when the display surface of the display device is viewed from the front; and FIG. 3B is a schematic view illustrating when the display surface of the display device is viewed diagonally;

Note that in the example illustrated each of the light guide plates are arranged so that the center of the light emitting surfaces overlap. Viewing the light emitting surface from any point along the Y axis which passes through the center of the light emitting surface of each light guide plate, a user is able to perceive a combined image wherein monochromatic grayscale images are perfectly overlapped, and thus the user is able to perceive an image output with natural color tones.

FIG. 3A illustrates an example of the image perceived when a user views the light emitting surface from any point along the Y axis which passes through the center of the light emitting surface of the three light guide plate. As above described, the display device 100 according to one or more embodiments includes three light guide plates with light emitting surfaces that each output a monochromatic grayscale image of light of a mutually different color. When the three monochromatic grayscale images output from the three light emitting surfaces are viewed superposed, a viewer is able to perceive an image output with natural color tones.

Conversely, an image output with natural color tones can only be perceived as depicted in FIG. 3A when viewed from a position where the monochromatic grayscale images output from the light emitting surfaces of the light guide plate appear perfectly superposed. For example, if a user were to view the light emitting surface from the diagonal, this creates an offset in the visual angle created between the user and each of the light guide plates; therefore, the three monochromatic grayscale images output from the light emitting surfaces of the three light guide plates overlap at mutually shifted locations.

FIG. 3B illustrates an example of the image perceived when the user views the light emitting surface from a position shifted to the right relative to any point along the Y axis which passes through the center of the light emitting surface of the three light guide plates. In the example illustrated, the monochromatic grayscale image output from the light emitting surface of the first light guide plate 10 is not perfectly superposed with the monochromatic grayscale image output from the second light guide plate 20 and the monochromatic grayscale image output from the third light guide plate 30. Consequently, there is an offset. At this point the portion at which the monochromatic grayscale images are superposed are perceived as intermediate colors where the colors from the monochromatic grayscale images mix; further only the monochromatic grayscale is seen where the monochromatic grayscale images do not overlap.

Thus, the display device 100 according to one or more embodiments is capable of providing images that appear different in accordance with a user's viewing position relative to the light emitting surface. Hereby, the display device 100 is capable of outputting an image from the light emitting surface with characteristic presentation effects different from a normal full color image.

Example: Differences in Visual Angle Depending on Location of the User's Eyes

Figure 4:
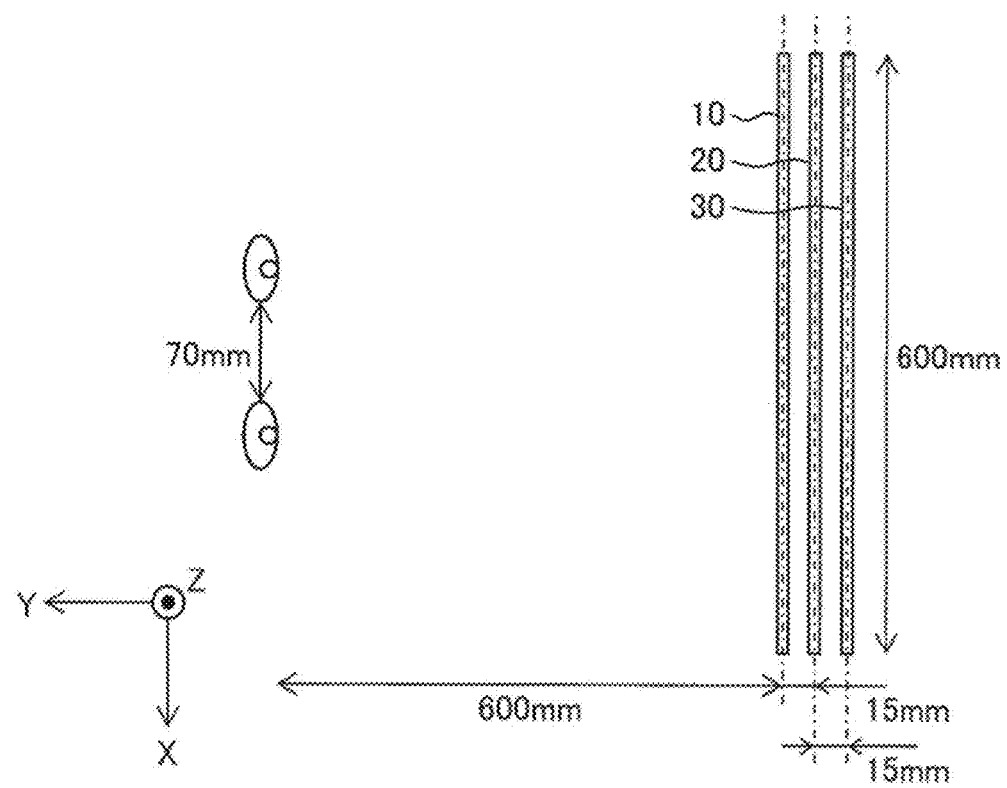
FIG. 4 is a schematic view illustrating a display device according to a first embodiment and illustrates the positional relationship of the display device with a user's eyes.
Figure 5A:
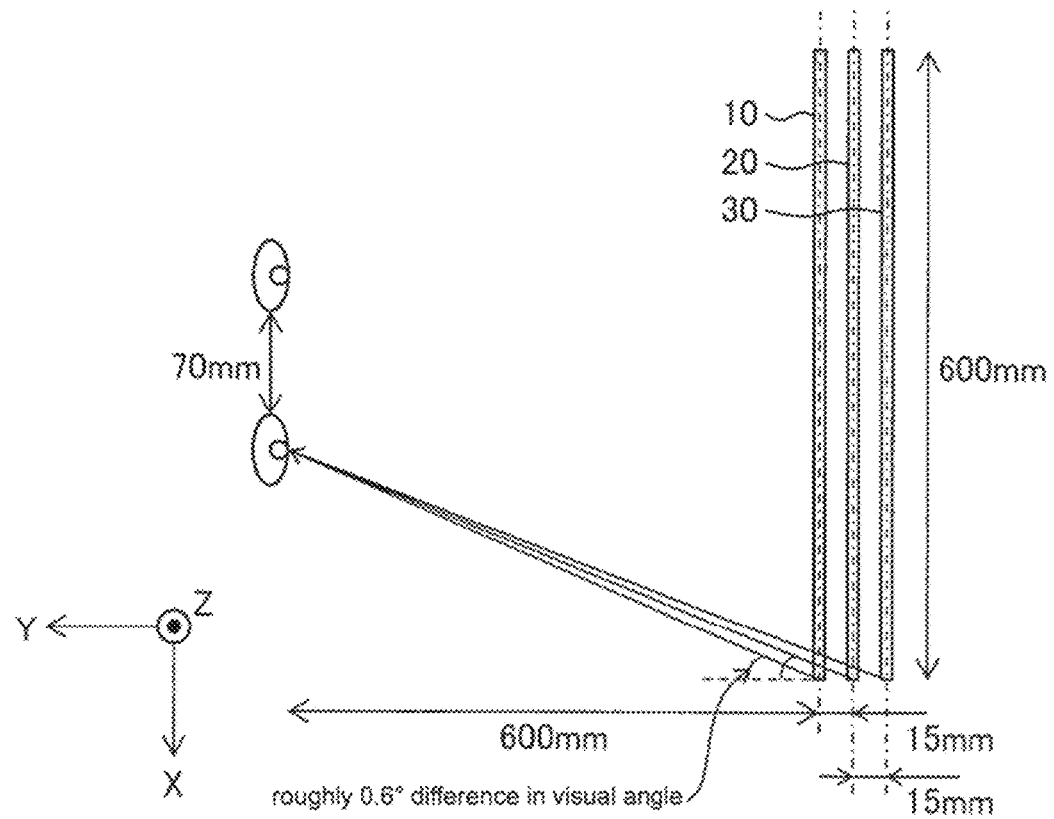
FIGS. 5A and 5B are schematic views illustrating the positional relationship between a display device according to a first embodiment and a user's eyes.
Figure 5B:
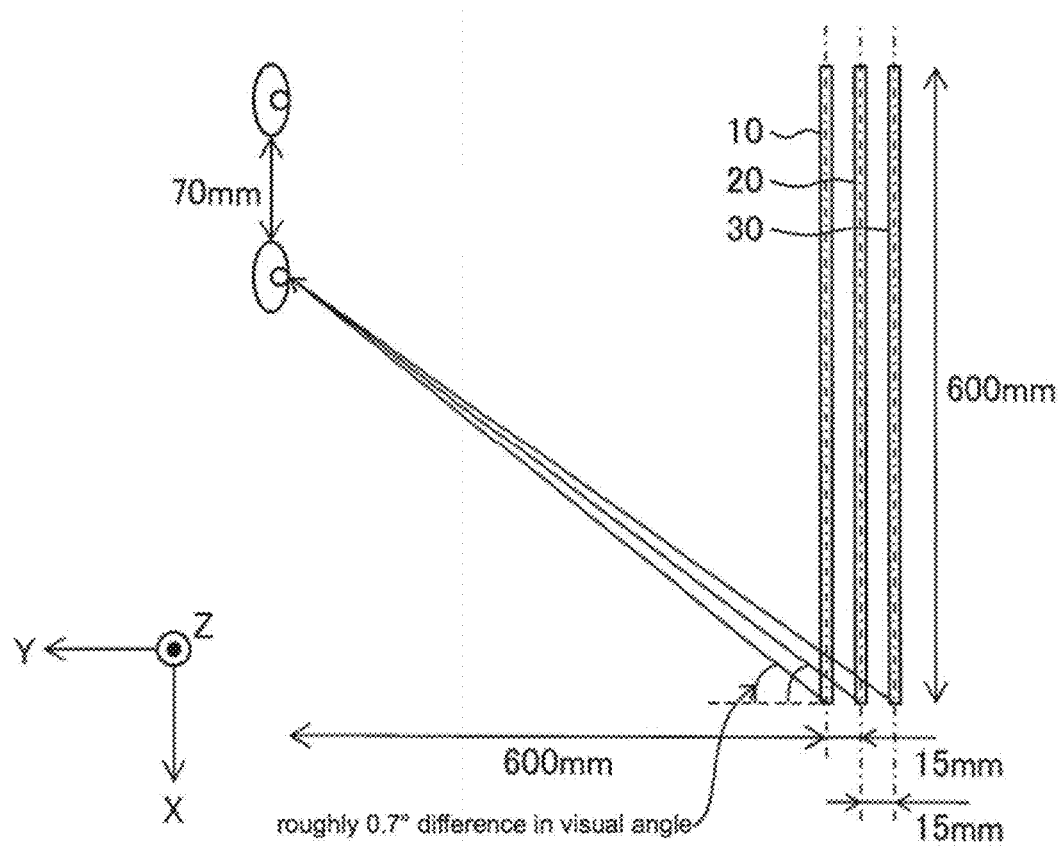

Here, an example is given of how the visual angle differs depending on the position of a user's eyes when a user views a display device 100 according to one or more embodiments. FIG. 4, FIG. 5A, and FIG. 5B are used for describing this example. FIG. 4 is a schematic view of a display device 100 according to one or more embodiments and illustrates the positional relationship of the display device with a user's eyes; FIG. 5A is a schematic view depicting the differences in visual angle with the ends of the light guide plates when a user faces the center of the light emitting surface; and FIG. 5B is a schematic view depicting the differences in visual angle with the other ends of the light guide plates when a user faces one end of the light emitting surface. FIG. 4, FIG. 5A, and FIG. 5B are top views of the user and the display device 100.

FIG. 4, FIG. 5A, and FIG. 5B are illustrated assuming that the three light guide plates are a length of 600 mm, and the gaps therebetween are 15 mm. Moreover, the drawings assume that a user is directly facing the light emitting surface of the light guide plate, and that the distance from the user's eyes to the light emitting surface of the first light guide plate 10 is 600 mm.

It is assumed that the effects presented ensure that on the one hand the user sees the state depicted in FIG. 3A when the user's eyes are between in front of the left edge and in front of the right edge of the first light guide plate 10; and that on the other hand, the user will see the state depicted in FIG. 3B when the user's eyes are shifted from between in front of the left edge and in front of the right edge of the first light guide plate 10. Here, and image shown on the first light guide plate 10 is a range of visual angles of 45° to the left and to the right from in front of the user's eyes when the user's eyes are between in front of the left edge and in front of the right edge of the first light guide plate 10.

FIG. 4 assumes that the center between the user's eyes lies on a straight line passing through the center of the light emitting surface of each of the first light guide plate 10, the second light guide plate 20, and the third light guide plate 30 in the display device 100. FIG. 4 also assumes that the user is located in front of the light surface, and the user's eyes are separated by 70 mm. At this point, the user is able to perceive the combined image when viewing the light emitting surface of the first light guide plate 10 from the center, wherein the light emitting surfaces of the three light guide plates output monochromatic grayscale images which are mutually superposed.

As in FIG. 4, FIG. 5A assumes that the center between the user's eyes lies on a straight line passing through the center of the light emitting surfaces of the three light guide plates. Here it is assumed that the user's right eye is looking at the right edge of the first light guide plate 10. At this point, light exiting from the right edge of each of the light emitting surfaces of the first light guide plate 10, the second light guide plate 20, and the third light guide plate 30 enters the user's right eye. The predetermined distance is the 15 mm gap between the light guide plates; therefore, the distances from the user's eyes to the light emitting surface in each of the light guide plates are mutually different. Hereby, the visual angles created between the user's right eye and the right edges of the light guide plates are mutually different. In the case of the above describes positional relationship, there is a large difference of roughly 0.6° between the visual angle created by the user's right eye and the right edge of the first light guide plate 10 and the visual angle created by the user's right eye and the right edge of the second light guide plate 20. This difference in visual angle increases as the visual angle between the user's right eye and the right age of each of the light guide plates increases.

The basic configuration in FIG. 5B is identical to the configuration in FIG. 5A; however in the case of FIG. 5B, the users both the user's eyes face the left edge of the first light guide plate 10. At this point the visual angle created between the user's right eye the right edge of the light guide plates is larger than in the case depicted in FIG. 5A. Accordingly, there is a larger difference between visual angles created between the user's right eye and the right end of the light guide plates. In the example illustrated there is a large difference of roughly 0.7° between the visual angle created by the user's right eye and the right edge of the first light guide plate 10 and the visual angle created by the user's right eye and the right edge of the second light guide plate 20.

Note that a difference between visual angles of greater than roughly 0.7° can be problematic, as the user may perceive the monochromatic grayscale images output from each of the light guide plates as separate images. Additionally, if the distance between the light guide plates were greater than 15 mm here, the above-mentioned difference between the visual angles surpasses 0.7°. Therefore, the distance between light guide plates is preferably no greater than 15 mm to achieve the above-mentioned kinds of display effects.

Spacing Between the Light Guide Plates

Figure 6:
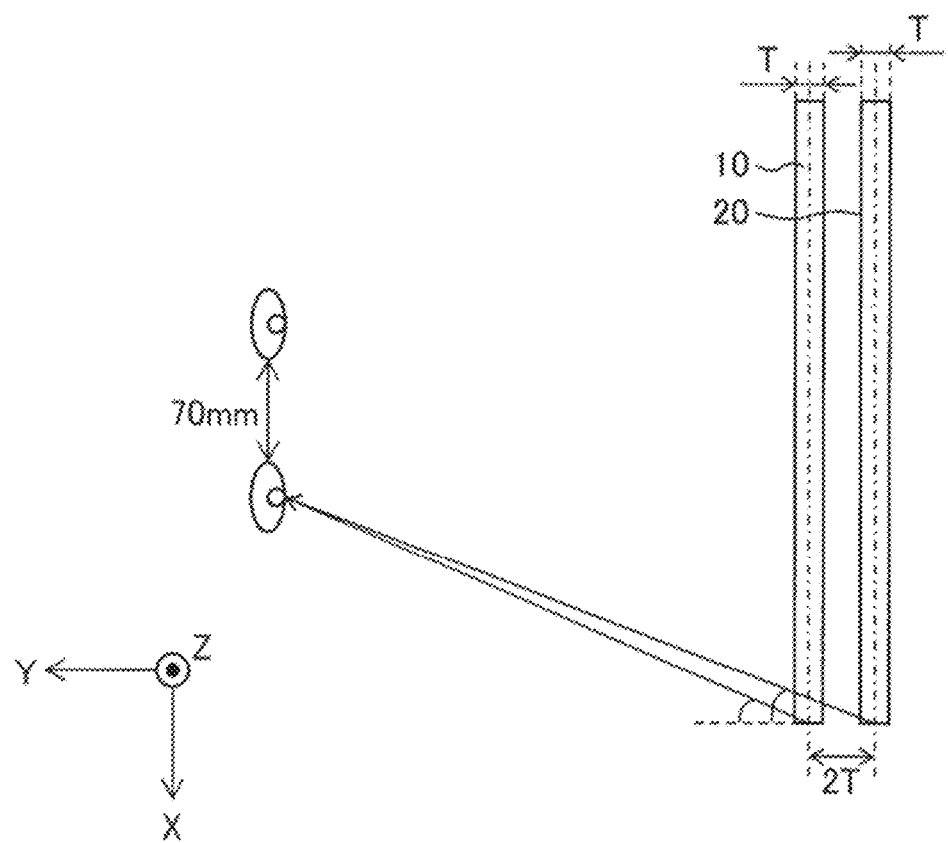
FIG. 6 is a schematic view illustrating an example of the thicknesses of and the gap between light guide plates in a display device according to a first embodiment.

The above describes a preferable example where the distance between light guide plates is no greater than 15 mm; however, the configuration is not limited thereto. Below is described an example of establishing a different predetermined distance between the light guide plates; more specifically, an example is described by way of FIG. 6 where the distance is set based on the thickness of the light guide plates. FIG. 6 is a schematic view illustrating an example of the thicknesses of, and the gap between light guide plates in the display device 100 according to one or more embodiments. Note that FIG. 6 is a top view of the user and the display device 100; in the example illustrated the third light guide plate 30 is omitted.

Here it is assumed that the thicknesses of the first light guide plate 10 and the second light guide plate 20 are both T (mm). It is also assumed that the distance between the centers of the light guide plates in the thickness direction is exactly double the thickness at 2T (mm). In other words, it is assumed that the first light guide plate 10 and the second light guide plate 20 are separated by exactly T (mm). Thus, the distance between the centers of the light guide plates in the thickness direction thereof may be established on the basis of the thickness of the light guide plates.

The distance between the centers of the light guide plates in the thickness direction thereof may be double or even quadruple thickness of the light guide plates.

The distance between the centers of the light guide plates in the thickness direction thereof may thus be established on the basis of the thickness of the light guide plate. Consider for example that a portion of the light leaking from the second light guide plate 20 toward a direction opposite the user reflects from the front surface of the third light guide plate 30 and is output toward the user. The light that exits from the light guide plate immediately in front of the user and the light reflected by the light guide plate furthest from the user can be used to render a full-color image and to apply even further variation to the changes in the superposition of the monochromatic grayscale images when the user changes viewpoint.

As above described, the user sees a combined image which superposes the monochromatic grayscale images each made up of a mutually different color and output from the light emitting surfaces of the display units arranged spaced apart in the display device 100 according to one or more embodiments. Hereby is provided a display device that exhibits superior effects such as a richly expressive display with clear changes in color tone. Given that the display surfaces are arranged spaced apart, the manner in which monochromatic grayscale images are superposed changes in accordance with the location of the user's viewpoint. Hereby a display device may be provided, where the light emitting surface therein outputs an image with characteristic display effects that are different from providing a stereoscopic image.

The tone of the monochromatic grayscale images may be corrected to improve the visibility of the combined image. For example, at least a portion of the combined image must be set where the tones of red, green, and blue are at maximum so that the region appears white when the image is viewed from the front.

The monochromatic grayscale images of mutually different colors and output from the light emitting surfaces of the light guide plates may have a substantially identical design. At this point, the user is shown a full-color image by way of each of the colors being appropriately combined when the user views the image from the front.

Finally, the emission pattern in the light guide plates may be different from each other. For instance, the display device 100 may be configured from a combination of light guide plates possessing emission patterns with mutually different width w, length 1, and density in the region of the light emitting surface that emits light.

In one or more embodiments the light guide plates are arranged spaced apart at a predetermined distance. Thus, it is possible to prevent light of a different color from adding to the monochromatic grayscale image by ensuring that the light guide plates are optically spaced apart. It is sufficient to arrange the light guide plates spaced apart by the predetermined distance, for instance, by inserting a film to prevent the light guide plates from being in close contact.

Second Embodiment

A second embodiment is described below. A game machine according to one or more embodiments is provided with a display device according to the aforementioned first embodiment.

The game machine is configured to output images from the display device 100 in accordance with the progress of play. The game machine is also preferably configured so that the display device 100 is located in front of the user when the user operates said game machine. The type of game machine is not particularly limited, and thus may be a pachinko machine or a slot machine. Here, the game machine outputs an image from the display device 100 in accordance with the progress of play, and at the same time provides the user with images of having different visual appearances when the viewing position of said user changes.

Modification Examples

In each of the above-mentioned embodiments the display device 100 is configured with a plurality of light guide plates where all the light guide plates output a monochromatic grayscale image. However, all the light guide plates do not need to be employed at all times. For example, the configuration may be such that of any two of the three light guide plates outputs a monochromatic grayscale image. Hereby, the combination of the monochromatic grayscale images may be appropriately established on the basis of the type of image for output to achieve an even more richly expressive display device.

Overview

A first configuration of the display device (100) includes a plurality of transparent display units (first light guide plate 10, second light guide plate 20, and third light guide plate 30), each unit configured to include a light emitting surface; the display units arranged spaced apart by a predetermined distance in a direction perpendicular to the light emitting surfaces such that the light emitting surfaces are parallel to each other; and each light emitting surface outputs a monochromatic grayscale image of a mutually different color.

The above configuration makes it possible to see a combined image wherein the monochromatic grayscale images are superposed, with the monochromatic grayscale images each made up of a mutually different color and output from the light emitting surfaces of the display units that are arranged spaced apart. Given that the display surfaces are arranged spaced apart, the manner in which monochromatic grayscale images are superposed changes in accordance with the location of the user's viewpoint. Hereby a display device may be provided, where the light emitting surface therein outputs a richly expressive image with characteristic display effects that are different from providing a stereoscopic image.

A second configuration of the display device (100) may further include three of said display units (first light guide plate 10, second light guide plate 20, and third light guide plate 30) where the monochromatic grayscale images output by the light emitting surfaces of the display units are red, green, and blue grayscale images respectively.

In the aforementioned configuration each of the light emitting surfaces of the three display units may output monochromatic grayscale images from red light, green light, and blue light. Hereby is provided a display device that exhibits superior effects such as outputting an image on the basis of the primary colors with clear changes in color tone.

A third configuration of the display device (100) where a combined image is a combination of said monochromatic grayscale images, and the tones of red, green, and blue are set to the maximum value in at least a portion of said combined image such that said portion appears as white light when viewed from the front.

The aforementioned configuration allows for at least a portion of the combined image to show a bright white visual when the combined image is viewed from the front. Accordingly, this allows for a bright full color visual that includes white.

A fourth configuration of the display device (100) may include any of the first through third configurations where the monochromatic grayscale images of mutually different colors output from each of the light emitting surfaces may have a substantially identical design.

This configuration shows the user a full-color image by way of each of the colors being appropriately combined when the user views the image from the front.

A fifth configuration of the display device (100) may include any of the first through fifth configurations where the display units (first light guide plate 10, second light guide plate 20, and third light guide plate 30) are light guide plates that direct light entering therein and cause a portion of the light to exit from the light emitting surface; and the light guide plates include a specific emission pattern.

The aforementioned configuration causes the monochromatic grayscale image to be output from the light emitting surface in accordance with the specific emission pattern in the light guide plate. Hereby, combining the emission patterns of the plurality of light guide plates thereby exhibits superior effects such as providing a richly expressive display device with clear changes in color tone.

A sixth configuration is a display device (100) with the second configuration that further includes three of said light guide plates (10, 20, 30); and a plurality of light sources (first light source 11, second light source 21, and third light source 31); each light source is optically coupled to a single light guide plate; the light sources are disposed at the end surfaces of the light guide plates; and the light sources each emit red, green, and blue light to the corresponding light guide plate.

The aforementioned configuration allows the light guide plates to output a grayscale image according to the monochromatic light emitted by the light source from the light emitting surface. Hereby, the combination of monochromatic light is established in accordance with the light source.

A seventh configuration of the display device may include the fifth configuration where the emission pattern has a length parallel to the light emitting surface, and a width that is perpendicular to said length; and the light guide plates (10, 20, 30) manifest the tone in the grayscale image in accordance with the width of the emission patterns.

The aforementioned configuration allows the light emitting surface of the light guide plates to output a monochromatic grayscale image with a tone manifested in accordance with the width of the emission patterns. For instance, the length of the emission patterns may be mutually different between light guide plates so that the light guide plates output monochromatic grayscale images of different tones.

An eighth configuration of the display device (100) may include the fifth configuration where the emission pattern has a length parallel to the light emitting surface, and a width that is perpendicular to said length; and the light guide plates (10, 20, 30) manifest the tone in the grayscale image in accordance with the length of the emission patterns.

The aforementioned configuration allows the light emitting surface of the light guide plates to output a monochromatic grayscale image with a tone manifested in accordance with the length of the emission patterns. For instance, the length of the emission patterns may be mutually different between light guide plates so that the light guide plates output monochromatic grayscale images of different tones.

A ninth configuration of the display device (100) may include the fifth configuration where the light guide plates (10, 20, 30) manifest the tone in the grayscale image in accordance with the density of the emission patterns.

The aforementioned configuration allows the light emitting surface of the light guide plates to output a monochromatic grayscale image with a tone manifested in accordance with the density of the emission patterns. For instance, the density of the emission patterns may be mutually different between light guide plates so that the light guide plates output monochromatic grayscale images of different tones.

A ninth configuration of the display device (100) may include any one of the first through tenth configurations where the predetermined distance is no greater than 15 mm.

The aforementioned configuration achieves the following display effects. That is, a display effect where the grayscale images from the light guide plates to appear superposed when the user's eyes are within a predetermined range for sizes typically used in design, for instance when designing a game machine; at the same time the aforementioned configuration allows the grayscale images from the light guide plates to appear shifted from each other when the user's eyes are not in the predetermined range.

An eleventh configuration of the display device (100) may include any one of the first through ninth configurations where the distance between the centers of the display units in the thickness direction thereof is no less than double the thickness of the display units.

According to the aforementioned configuration, the plurality of display units (first light guide plate 10, second light guide plate 20, and third light guide plate 30) are arranged parallel to each other and spaced apart by no less than double the thicknesses thereof; thus, the aforementioned configuration allows light emitting surfaces to output monochromatic grayscale images of a mutually different color.

A twelfth configuration of the display device (100) may include any one of the first through ninth configurations where the distance between the centers of the display units in the thickness direction thereof is no less than quadruple the thickness of the display units.

According to the aforementioned configuration, the plurality of display units are arranged parallel to each other and spaced apart by no less than quadruple the thicknesses thereof; thus, the aforementioned configuration allows light emitting surfaces to output monochromatic grayscale images of a mutually different color.

A game machine according to a thirteenth configuration is provided with a display device (100) with any of the first through twelfth configurations where visuals are presented on the display device in accordance with the progress of play.

The aforementioned configuration provides the same effects as the display device of a first embodiment.

The present invention is not limited to each of the above described embodiments, and may be modified in various ways and remain within the scope of the claims. The technical means disclosed in each of the different embodiments may be combined as appropriate, and an embodiment obtained in such a manner remains within the technical scope of the present invention.

REFERENCE NUMERALS

100 Display Device
10 First light guide plate (display unit)
20 Second light guide plate (display unit)
30 Third light guide plate (display unit)
11 First light source (light source)
21 Second light source (light source)
31 Third light source (light source)
12 Emission pattern

The invention claimed is:

1. A display device comprising:
a plurality of transparent display units, each transparent display unit comprising a light emitting surface, wherein
the plurality of transparent display units are arranged spaced apart by a predetermined distance in a direction perpendicular to the light emitting surfaces such that the light emitting surfaces are parallel to each other; and
each light emitting surface outputs a monochromatic grayscale image of a mutually different color.

2. The display device according to claim 1, wherein
the plurality of transparent display units comprises three of the transparent display units, and
the monochromatic grayscale images output by the light emitting surfaces of the three transparent display units comprise red, green, and blue grayscale images respectively.

3. The display device according to claim 2, wherein a combined image comprises a combination of the monochromatic grayscale images, and tones of the red, the green, and the blue grayscales images are set to a maximum value in at least a portion of the combined image such that the portion of the combined image appears as white light when viewed a front.

4. The display device according to claim 1, wherein each of the monochromatic grayscale images of mutually different colors output from each of the light emitting surfaces comprise a substantially identical design.

5. The display device according to claim 1, wherein the plurality of transparent display units comprises light guide plates that direct light entering therein and cause a portion of the light to exit from the light emitting surface; and
the light guide plates comprise a specific emission pattern.

6. The display device according to claim 5, further comprising: three of the light guide plates; and
a plurality of light sources, wherein
each light source of the plurality of light sources is optically coupled to a single light guide plate;
the plurality of light sources are disposed at end surfaces of the light guide plates; and
the plurality of light sources each emit red, green, and blue light to a corresponding light guide plate.

7. The display device according to claim 5, wherein each of the specific emission patterns comprises a length parallel to the light emitting surface, and a width that is perpendicular to the length; and
the light guide plates manifest a tone of the monochromatic grayscale image in accordance with the width of the specific emission patterns.

8. The display device according to claim 5, wherein the each of the specific emission patterns comprises a length parallel to the light emitting surface, and a width that is perpendicular to the length; and
the light guide plates manifest a tone of the monochromatic grayscale image in accordance with the length of the specific emission patterns.

9. The display device according to claim 5, wherein the light guide plates manifest a tone of the monochromatic grayscale image in accordance with a density of the specific emission patterns.

10. The display device according to claim 1, wherein the predetermined distance is no greater than 15 mm.

11. The display device according to claim 1, wherein a distance between each center of each of the plurality of transparent display units in a thickness direction thereof is no less than double a thickness of each of the plurality of transparent display units.

12. The display device according to claim 1, wherein a distance between each center of each of the plurality of transparent display units in a thickness direction thereof is no less than quadruple a thickness of each of the plurality of transparent display units.

13. A game machine comprising:
the display device according to claim 1, wherein
visuals are presented on the display device in accordance with a progress of play.

14. The display device according to claim 2, wherein the monochromatic grayscale images of mutually different colors output from each of the light emitting surfaces comprise a substantially identical design.

15. The display device according to claim 3, wherein the monochromatic grayscale images of mutually different colors output from each of the light emitting surfaces comprise a substantially identical design.

16. The display device according to claim 2, wherein the plurality of transparent display units comprises light guide plates that direct light entering therein and cause a portion of the light to exit from the light emitting surface; and
the light guide plates each comprise a specific emission pattern.

17. The display device according to claim 3, wherein the plurality of transparent display units comprise light guide plates that direct light entering therein and cause a portion of the light to exit from the light emitting surface; and
the light guide plates each comprise a specific emission pattern.

18. The display device according to claim 4, wherein the plurality of transparent display units comprise light guide plates that direct light entering therein and cause a portion of the light to exit from the light emitting surface; and
the light guide plates each comprise a specific emission pattern.

19. The display device according to claim 14, wherein the plurality of transparent display units comprise light guide plates that direct light entering therein and cause a portion of the light to exit from the light emitting surface; and
the light guide plates each comprise a specific emission pattern.

20. The display device according to claim 15, wherein the plurality of transparent display units comprise light guide plates that direct light entering therein and cause a portion of the light to exit from the light emitting surface; and the light guide plates each comprise a specific emission pattern.

* * * * *